Feb. 21, 1939.  J. I. HULL  2,148,296
DYNAMO-ELECTRIC MACHINE
Filed Oct. 12, 1934  2 Sheets-Sheet 1

Inventor:
John I. Hull,
by Harry E. Dunham
His Attorney.

Feb. 21, 1939.  J. I. HULL  2,148,296
DYNAMO-ELECTRIC MACHINE
Filed Oct. 12, 1934  2 Sheets-Sheet 2

Inventor:
John I. Hull,
by Harry E. Dunham
His Attorney.

Patented Feb. 21, 1939

2,148,296

UNITED STATES PATENT OFFICE 2,148,296

DYNAMO-ELECTRIC MACHINE

John I. Hull, Swampscott, Mass., assignor to General Electric Company, a corporation of New York Application October 12, 1934, Serial No. 748,007

12 Claims. (Cl. 171—223)

My invention relates to dynamo-electric machines.

It is an object of my invention to provide a dynamo-electric machine whose dynamic characteristics approximate to the desired degree or are essentially the same as its static characteristics.

It is a further object of my invention to provide a dynamo-electric machine having a high internal reactance.

More particularly my invention relates to a welding generator of improved construction.

Figure 1:
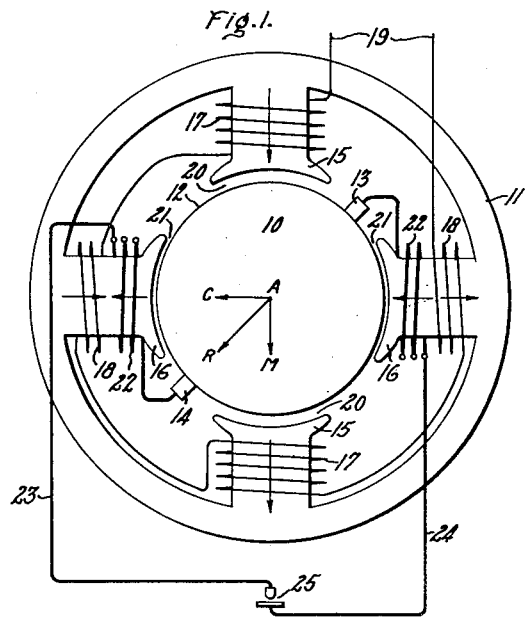
Figure 2:
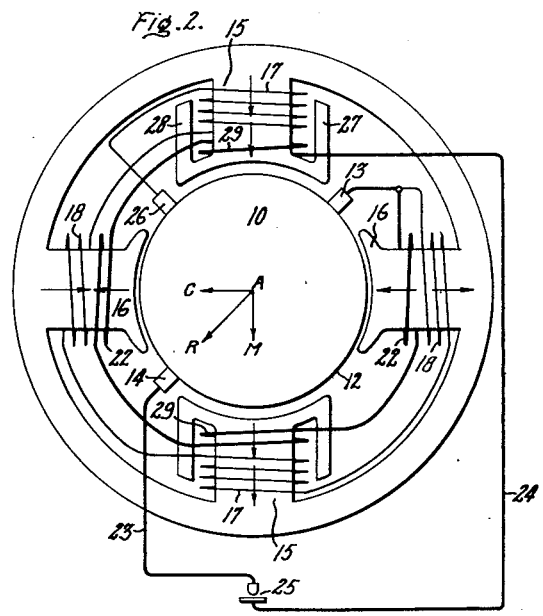
Figure 3:
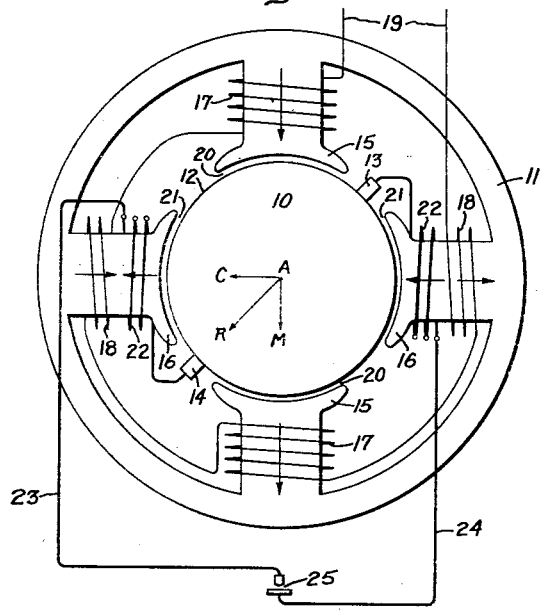
Figure 4:
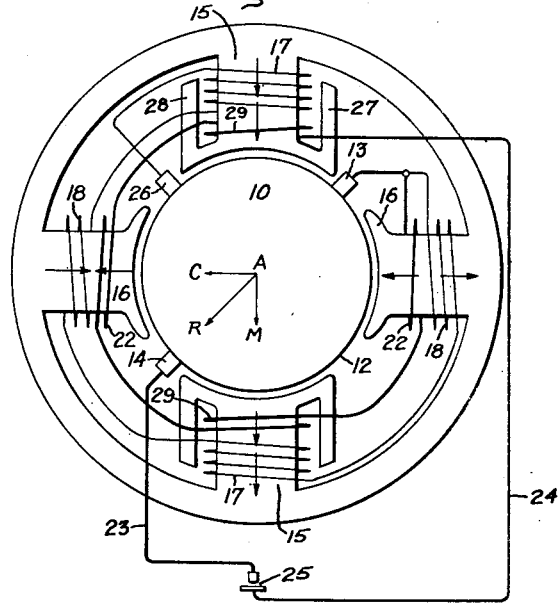

Further objects of my invention will become apparent from a consideration of the following description taken in connection with the accompanying drawings, Fig. 1 of which shows my invetion as applied to a separately excited split pole welding generator, Fig. 2 of which illustrates my invention as applied to a self-excited split pole welding generator and Figs. 3 and 4 of which show modifications of the arrangements illustrated in Figs. 1 and 2.

The dynamo-electric machine illustrated in Fig. 1 comprises an armature 10 and a field structure 11. The armature 10 is provided with an armature winding (not illustrated) which is connected to a commutator 12 on which bear the load brushes 13 and 14. The machine is of the split pole design having an $n$ pole armature winding and a field structure comprising $2n$ pole pieces arranged in two sets with an equal number of pole pieces in each set, and with adjacent pole pieces (those pairs located between consecutive commutation zones) in the separate sets arranged to be of like polarity. One set of pole pieces 15 will hereafter be referred to as the main pole pieces and the other set of pole pieces 16 will hereafter be referred to as the cross pole pieces. The main pole pieces 15 are provided with exciting winding 17 and the cross pole pieces 16 are provided with exciting windings 18. These exciting windings are connected in series with one another to a source of supply 19. The arrangement of these pole pieces relative to the armature winding is such that the voltage induced between the load brushes 13 and 14 is the algebraic sum of the voltages induced by the sets of pole pieces 15 and 16.

The directions of the flux in the main and cross pole pieces produced by the exciting windings 17 and 18 are indicated by arrows in the drawings. The drawings also indicate by an arrow AR the direction of the armature reaction which is substantially in line with the load brushes 13 and 14. This armature reaction has been resolved into its components AM and AC, the first of which acts to increase the flux in the main pole pieces 15 and the second of which acts to decrease the flux in the cross pole pieces 16 as the load current increases. The main pole pieces and cross pole pieces 16 operate without extreme saturation so that the flux therein may be varied a substantial amount by the armature reaction due to load current.

A differential compounding effect is obtained by making the air gap 20 between the main pole pieces 15 and the armature 10 greater than the air gap 21 between the cross pole pieces 16 and the armature 10. In the arrangement illustrated the air gap under the main pole pieces 15 is about twice the air gap under the cross pole pieces 16, and the exciting windings 17 on the main pole pieces 15 have twice the number of turns as the windings 18 on the cross pole pieces 16. This turn ratio depends upon the air gap ratio and the desired operating characteristics of the generator. In the particular arrangement illustrated each set of pole pieces 15 and 16 generate in the armature winding at no load half the voltage between the brushes 13 and 14. As the load on the generator increases the component of the armature reaction AC in the axis of the cross pole pieces increases until the excitation furnished by windings 18 is neutralized and finally reversed, thereby reversing the direction of the voltage generated in that portion of the armature winding under the influence of the cross pole pieces 16. At the same time, the component of the armature reaction AM in the axis of the main pole pieces 15 increases but due to the greater air gap between the armature and the pole pieces 15, and further due to the increasing saturation here contrasted to the decreasing saturation in the axis of the cross pole pieces 16, the resulting flux increase is less than the flux decrease in the axis of the cross pole pieces 16. Consequently, the increase in voltage induced in that portion of the armature under the main pole pieces 15 is less than the decrease in voltage induced in that part of the armature under the influence of the cross pole pieces 16, and the resulting voltage between the brushes 13 and 14 decreases with load giving to the generator a drooping characteristic suitable for arc welding operations.

A lack of dynamic stability in a generator such as described results from the magnetic coupling between the exciting windings of the machine and the armature windings thereof. When the changes in load are very rapid the exciting windings tend to hold the flux conditions constant, and the voltage of the generator will not follow the change in load conditions as under static conditions by reason of the muffling currents produced by the transient voltages induced in the exciting windings. Thus under dynamic operations the voltage of a generator having a drooping characteristic tends to hold up as the load current increases and conversely fails to rise promptly when the load current drops. In a welding generator, when this condition is bad a small change in the arc provokes a wider surge of current than would otherwise result. For example, when the arc is suddenly lengthened increasing its voltage, the downward current surge may go through zero extinguishing the arc. Under such a condition it becomes especially difficult to hold the arc when drawing out the short circuit required for ignition. This undesirable condition can be remedied by reducing or neutralizing the magnetic coupling between the armature winding and the exciting windings of the machine.

The transient voltages induced in the exciting windings on the main and cross pole pieces may be neutralized or suppressed by connecting these windings in series. Thus the voltage induced in the windings on the main pole pieces by reason of their magnetic coupling with the armature winding is neutralized partly or wholly by the voltage induced in the windings on the cross pole pieces by reason of their magnetic coupling with the armature winding. In accordance with my invention the exciting windings 17 and 18 on the main and cross pole pieces 15 and 16 are so connected. In the arrangement illustrated in Fig. 1, although the number of exciting turns on the main pole pieces 15 is substantially twice the number of turns on the cross pole pieces 16, due to the fact that the air gap under the main pole pieces is twice that of the air gap under the cross pole pieces, the voltage induced in the windings on the main and cross pole pieces is substantially the same in the absence of any considerable saturation and the transient voltage induced in the cross pole piece windings is balanced by the transient voltage induced in the main pole piece windings. With this construction, neglecting the effect of eddy currents, the generator will operate dynamically in the same manner that it does statically. The effect of eddy currents can be substantially eliminated by laminating the magnetic structure of the machine.

In order to increase the effect of armature reaction in line with the cross pole pieces 16, these pole pieces may be provided with series windings 22 connected in series with the load circuit 23, 24 in which the arc welding equipment 25 is connected. It is to be noted that these series windings 22 are arranged on the cross pole pieces in such a manner that the flux produced thereby is in the same direction as that component of armature reaction AC acting in the axis of these pole pieces. By changing the number of turns in the series windings 22 any rate of change per ampere change in the load circuit 23, 24, 25 can be obtained in the voltage between brushes 13 and 14. It is, therefore, usually preferable to provide the series windings 22 with a number of taps so that this rate can be readily changed.

My invention will be better understood from a consideration of the operation of the machine above described.

The machine illustrated which has a 2:1 ratio of air gaps and a 2:1 ratio of field coil turns will have twice as much differential compounding in the cross pole pieces axis as cumulative compounding in the main pole piece axis even neglecting saturation. Further, the transient voltage induced by the flux of armature reaction in the main pole piece windings will be the same as that induced in the cross pole piece windings for although but half as much flux acts on the main pole pieces the number of turns are twice as great as on the cross pole pieces. Thus, by the proper series connection of these piece pole windings the transient voltage induced in the cross pole piece windings will balance that induced in the main pole piece windings, and the effect of magnetic coupling between the field windings and armature windings will be neutralized so that there will be a close similarity between the dynamic and static characteristics of the machine. It will be understood the preceding statement is rigorous only in the absence of saturation. The presence of saturation would normally require a somewhat larger turn ratio than the air gap ratio for complete cancellation of the transient voltages. A compounding effect will be obtained by reason of the greater air gap under the main pole pieces and by any saturation that may exist as has been pointed out above. Furthermore, the use of series windings on the cross pole pieces will permit adjustments of the current characteristic of the generator to the type of welding to be performed.

The transformer action between the series winding and the exciting winding on the cross pole pieces will affect the dynamic characteristics of the machine much as does the transformer action of the armature winding portion in line with the cross pole pieces, but this cumulative effect will not be serious; first, because the augmented transient cross field winding voltage can only tend to set up damping currents to the extent of preserving the no series winding short circuit flux ratio between main and cross field fluxes and, second, because of the extraordinary internal reactance of the generator.

A generator having a split pole construction for a given effect requires twice as many series turns since the windings act on only half the air gap area and the magnetic circuit thus has twice the magnetic reluctance. Twice the magnetomotive force and twice the reluctance gives the same flux, and this in turn produces twice the flux linkages since the turns are twice as many. Therefore, the reactance of the series winding on a split pole machine is double. Furthermore, the leakage reactance of the exciting windings on the main and cross pole pieces is considerable, and the machine may be properly designed to increase this leakage. Leakage reactance increases as the square of the turns. Because of the greater number of exciting turns on the main pole pieces a substantial increase in leakage reactance is obtained. The generator may be considered as a transformer having a short circuited secondary winding. The reactance of such a transformer is the sum of the primary and secondary leakage reactances. In the same way the reactance of a welding generator is the sum of the leakage reactance of the armature windings plus the leakage reactance of the field windings. Therefore, the reactance in the welding circuit is considerably increased by reason of the increased reactance in the exciting windings of the machine. One of the basic advantages of a split pole generator design results from its higher inherent reactance. The construction employed by me takes particular advantage of this characteristic.

In Fig. 2 of the drawings I have illustrated a self-excited machine embodying my invention. The exciting windings on the main and cross pole pieces are connected across the main brush 13 and an auxiliary brush 26 between which the generated voltage is due to the flux of the main pole pieces. It is possible to preserve the peculiarity of my invention while allowing this flux to be held constant by saturation in the armature if the main pole pieces 15 are provided with flux shunts 27 and 28 and a series winding 29 which generates a flux in the same direction as the exciting winding 17. As has been pointed out above, the variations in flux in the cross pole pieces may be augmented and adjusted by means of a series winding 22. The increase in flux in the main pole pieces due to armature reaction, however, requires a larger negative excitation on the cross pole pieces than would otherwise be necessary. The flux bypass 27, 28 and series windings 29 on the main pole pieces permits the transients to be neutralized with a smaller increase in the air gap main pole flux, thus removing the need of an augmented reversal of the cross-pole flux. The arrangement is such that the increase in flux which threads the exciting coils on the main pole pieces is greater than the increase in flux which threads the armature. That is, the desired flux change can be produced by the series coil 29 to generate a transient voltage in the exciting winding 17 which is in opposition to the transient voltage induced in the exciting winding 18 on the cross pole pieces, without causing a substantial increase in the air gap flux under the main poles, and the voltage induced in the armature winding between brushes 13 and 26 consequently remains substantially constant. Thus, it is possible to use considerable saturation even in the pole pieces 15.

In view of the described operation of the machine of Fig. 1 and the preceding remarks, the operation of the machine of Fig. 2 is now believed to be perfectly apparent.

In describing the machines illustrated by way of example it has been assumed that the magnetic circuits are not greatly saturated. Thus, for a 2:1 ratio of windings on the main and cross pole pieces, the flux in the main pole pieces on short circuit is 300 per cent while that on the cross pole pieces is —300 per cent, neglecting the effect of resistance drop of armature and series windings. Thus, to obtain the complete cancellation of transient voltages in the field windings, the field structure would of necessity be quite large. By increasing the turn ratio the sizes of the magnetic circuits may be reduced. Thus, for example, when using a 4:1 ratio of turns and air gaps the flux on short circuit is 167 per cent on the main pole pieces and —167 per cent on the cross pole pieces neglecting resistance drops as noted. For most machines, however, perfect neutralization of induced voltages in the field windings is not necessary, and machines embodying my invention may be made in which a predetermined amount of saturation is present in the field structure. It is, therefore, to be definitely understood that my invention is not to be limited to machines whose field structure operates without saturation.

From preceding statements regarding the construction and operation of a dynamo-electric machine embodying my invention, it is apparent that the desired results can be obtained merely by employing a large turn ratio of main to cross pole piece windings without using different air gaps where partial saturation is the stabilizer. Partial saturation may be made to act in the same manner as a larger air gap to increase the reluctance of the flux path through the main pole pieces. Furthermore, in connection with the embodiment illustrated in Fig. 2 the polar air gaps may be the same, provided saturation in the main pole pieces at the air gap provides the desired stabilization, and the flux bypass exaggerates the transient cancellation of induced voltages in the windings of the main and cross pole pieces. It is also apparent that saturation effect may be obtained in the armature of the machine. Figs. 3 and 4 show arrangements with equal air gaps. In these figures the same reference numbers as used in Figs. 1 and 2 have been applied to the same parts.

Machines constructed in accordance with my invention are particularly suited for welding operations because their dynamic characteristics can be varied broadly in relation to their static characteristics and when required can be made to approach very closely their static characteristics. My invention is, however, applicable to other dynamo-electric machines where it is desired to have the machine function in the same manner with rapid changes in load current that it functions with gradual changes in load current. Consequently, my invention is not limited in its application to welding generators.

I desired, therefore, to cover all such modifications as fall within the scope of my invention, which is set forth in the appended claims.

What I claim as new and desire to secure by Letters Patent of the United States is:

1. A dynamo-electric machine comprising an $n$ pole armature winding, a field structure comprising $2n$ pole pieces in which the flux is varied a substantial amount by armature reaction, said pole pieces being arranged in two sets with an equal number of pole pieces in each set and so positioned relative to said armature winding that the air gaps of the one set of pole pieces is greater than the air gaps of the other set of pole pieces, exciting windings on said pole pieces, and means for connecting said exciting windings to a source of supply, said exciting windings being connected in series so that the voltage induced in the windings on one set of pole pieces by reason of their magnetic coupling with said armature winding is neutralized to a substantial degree by the voltage induced in the windings on the other set of pole pieces by reason of their magnetic coupling with said armature winding.

2. A dynamo-electric machine comprising an $n$ pole armature winding, a field structure comprising $2n$ pole pieces in which the flux is varied a substantial amount in opposite directions by armature reaction, said pole pieces being arranged in two sets with an equal number of pole pieces in each set and so positioned relative to said armature winding that the air gaps of the one set of pole pieces is greater than the air gaps of the other set of pole pieces, exciting windings on said pole pieces, and means for connecting said exciting windings to a source of supply, said exciting windings being connected in series so that the voltage induced in the windings on one set of pole pieces by reason of their magnetic coupling with said armature winding is neutralized to a substantial degree by the voltage induced in the windings on the other set of pole pieces by reason of their magnetic coupling with said armature winding.

3. A split pole dynamo-electric machine having main pole pieces and cross pole pieces in both of which the flux is varied a substantial amount by armature reaction, the air gaps of said main pole pieces being larger than the air gaps of said cross pole pieces and the number of exciting windings on said main pole pieces being greater than the number of exciting windings on said cross pole pieces, and means for connecting said exciting windings in series to a source of supply so that the voltage induced in the windings on said main pole pieces by reason of their magnetic coupling with the armature of said dynamo-electric machine is neutralized to a substantial degree by the voltage induced in the windings on said cross pole pieces by reason of their magnetic coupling with the armature of said dynamo-electric machine.

4. A split pole dynamo-electric machine having main pole pieces and cross pole pieces in both of which the flux is varied a substantial amount by armature reaction, the air gaps of said main pole pieces being larger than the air gaps of said cross pole pieces and the number of exciting windings on said main pole pieces being greater than the number of exciting windings on said cross pole pieces, means for connecting said exciting windings in series to a source of supply so that the voltage induced in the windings on said main pole pieces by reason of their magnetic coupling with the armature of said dynamo-electric machine is neutralized to a substantial degree by the voltage induced in the windings on said cross pole pieces by reason of their magnetic coupling with the armature of said dynamo-electric machine, series windings on said main pole pieces acting in the same direction as said exciting windings located thereon, and flux by-passes about said windings on said main pole pieces.

5. A dynamo-electric machine comprising an $n$ pole armature winding, a field structure comprising $2n$ pole pieces in which the flux is varied a substantial amount by armature reaction and which are arranged in two sets with an equal number of pole pieces in each set, exciting windings on said pole pieces, means for connecting said exciting windings in series to a source of supply so that the voltage induced in the windings on one set of pole pieces by reason of their magnetic coupling with the armature of said dynamo-electric machine is neutralized to a substantial degree by the voltage induced in the windings on the other set of pole pieces by reason of their magnetic coupling with the armature of said dynamo-electric machine, series windings on one of said sets of pole pieces acting in the same direction as said exciting windings located thereon, and flux by-passes about the series and exciting windings on said one set of pole pieces.

6. A dynamo-electric machine comprising an armature, an $n$ pole armature winding, a field structure comprising $2n$ pole pieces in which the flux is varied a substantial amount by armature reaction and which are arranged in two sets with an equal number of pole pieces in each set, one of said sets of pole pieces being spaced a greater distance from said armature than said other set and being so positioned relative to the armature that armature reaction acts thereon in the opposite direction from which it acts on said other set, exciting windings arranged to set up a flux in one set of pole pieces in an opposite direction to the flux produced therein by armature reaction, and exciting windings on the other set of pole pieces arranged to set up a flux in the same direction as the flux produced by armature reaction, said exciting windings being connected in series to a source of excitation so that the voltage induced in the windings on one set of pole pieces by reason of their magnetic coupling with said armature winding is neutralized to a substantial degree by the voltage induced in the windings on said other set of pole pieces by reason of their magnetic coupling with said armature winding.

7. A dynamo-electric machine comprising an armature, an $n$ pole armature winding, a field structure comprising $2n$ pole pieces in which the flux is varied a substantial amount by armature reaction and which are arranged in two sets with an equal number of pole pieces in each set, the air gap between one set of pole pieces and said armature being greater than the air gap between the other set of pole pieces and said armature and said pole pieces being so positioned relative to said armature winding that armature reaction increases the excitation of that set of pole pieces having the greater air gap and decreases the excitation of said other set of pole pieces, exciting windings on said set of pole pieces having the greater air gap arranged to set up a flux in said pole pieces in the same direction as the flux produced by armature reaction, and exciting windings on said other set of pole pieces arranged to set up a flux therein in an opposite direction to the flux produced therein by armature reaction, said exciting windings being connected in series to a source of excitation so that the voltage induced in the windings on one set of pole pieces by reason of their magnetic coupling with said armature winding is neutralized to a substantial degree by the voltage induced in the windings on said other set of pole pieces by reason of their magnetic coupling with said armature winding.

8. A dynamo-electric machine comprising an armature winding provided with a commutator, load brushes bearing on said commutator, a field magnet structure having main pole pieces whose air gap flux is substantially unaffected by armature reaction, and cross pole pieces whose air gap flux is varied by armature reaction, the arrangement of said pole pieces being such that the voltage between said load brushes is equal to the algebraic sum of the voltages induced in said armature winding by pairs of main and cross pole pieces whose flux is additive at no load, exciting windings on said main pole pieces, exciting windings on said cross pole pieces, means for connecting the exciting windings on said main pole pieces in series with the exciting windings on said cross pole pieces so that the voltages induced in the windings on said main pole pieces by reason of their magnetic coupling with said armature winding is neutralized to a substantial degree by the voltage induced in the windings of said cross pole pieces by reason of their magnetic coupling with said armature winding, series windings on said main pole pieces producing a flux therein in additive relation to the flux produced by said exciting windings and a flux by-pass associated with said main pole pieces and so constructed and arranged that the total increase of flux which threads the exciting windings on said main pole pieces and which is due in part to said series windings is greater than the increase in the air gap flux of said main pole pieces which induces voltage in said armature winding.

9. A dynamo-electric machine comprising an armature winding provided with a commutator, load brushes and an auxiliary brush bearing on said commutator, a field magnet structure having main pole pieces so placed relative to said armature winding that armature reaction tends to strengthen their excitation and cross pole pieces so placed relative to said armature winding that armature reaction tends to reverse their excitation, the arrangement being such that the voltage induced in said armature winding between one of said load brushes and said auxiliary brush is due to the flux of said main pole pieces and that the voltage induced in said armature winding between the other of said load brushes and said auxiliary brush is due to the flux of said cross pole piece, the voltage between said load brushes being equal to the algebraic sum of the voltages between said auxiliary brush and each of said load brushes, exciting windings on said main and cross pole pieces connected in series with one another between said auxiliary brush and one of said load brushes and across that portion of the armature which has a voltage induced therein by said main pole pieces, said exciting winding being so connected that the voltages induced in the windings on said main pole pieces by reason of their magnetic coupling with said armature winding is neutralized to a substantial degree by the voltages induced in the windings on said cross pole pieces by reason of their magnetic coupling with said armature winding, series windings on said main pole pieces producing a flux therein in additive relation to the flux produced by said exciting windings and a flux by-pass associated with said main pole pieces and so constructed and arranged that the flux which threads the exciting windings on said main pole pieces and which is due in part to the series winding is greater than the increase in the air gap flux of said main pole pieces which induces voltage in said armature winding.

10. A dynamo-electric machine comprising an armature winding provided with a commutator, load brushes and an auxiliary brush bearing on said commutator, a field magnet structure having main pole pieces so placed relative to said armature winding that armature reaction tends to strengthen their excitation and cross pole pieces so placed relative to said armature winding that armature reaction tends to reverse their excitation, the arrangement being such that the voltage induced in said armature winding between one of said load brushes and said auxiliary brush is due to the flux of said main pole pieces and that the voltage induced in said armature winding between the other of said load brushes and said auxiliary brush is due to the flux of said cross pole pieces, the voltage between said load brushes being equal to the algebraic sum of the voltages between said auxiliary brush and each of said load brushes, exciting windings on said main and cross pole pieces connected in series with one another between said auxiliary brush and one of said load brushes and across that portion of the armature which has a voltage induced therein by said main pole pieces, said exciting winding being so connected that the voltages induced in the windings on said main pole pieces by reason of their magnetic coupling with said armature winding is neutralized to a substantial degree by the voltages induced in the windings on said cross pole pieces by reason of their magnetic coupling with said armature winding, series windings on said cross pole pieces producing a flux in opposition to the flux of said exciting windings on said cross pole pieces, series windings on said main pole pieces producing a flux therein in additive relation to the flux produced by said exciting windings and a flux by-pass associated with said main pole pieces and so constructed and arranged that the flux which threads the exciting windings on said main pole pieces and which is due in part to the series winding is greater than the increase in the air gap flux of said main pole pieces which induces voltage in said armature winding.

11. A split pole dynamo-electric machine having main pole pieces and cross pole pieces in both of which the flux is varied a substantial amount by armature reaction, the reluctance of the flux path through said main pole pieces being greater than the reluctance of the flux path through said cross pole pieces and said pole pieces being positioned relative to the armature of said machine so that armature reaction increases the flux in said main pole pieces and acts to reverse the flux in said cross pole pieces, main pole piece exciting windings and cross pole piece exciting windings, the number of turns of said main pole piece exciting windings being larger than the number of turns of said cross pole piece exciting windings in substantially the same ratio that the reluctance of the flux path through said main pole pieces is greater than the reluctance of the flux path through said cross pole pieces, and means for connecting said exciting windings in series to a source of supply so that the voltage induced in the windings on said main pole pieces by reason of their magnetic coupling with the armature of said dynamo-electric machine is neutralized to a substantial degree by the voltage induced in the windings on said cross pole pieces by reason of their magnetic coupling with the armature of said dynamo-electric machine.

12. A split pole dynamo-electric machine having main pole pieces and cross pole pieces in both of which during operation of the machine the flux is varied a substantial amount with variations in load current, the reluctance of the flux path through said main pole pieces being greater than the reluctance of the flux path through said cross pole pieces and said pole pieces being positioned relative to the armature of said machine so that armature reaction increases the flux in said main pole pieces and acts to reverse the flux in said cross pole pieces, exciting windings on said main pole pieces and on said cross pole pieces, said windings having a turn ratio relative to the flux changes in the pole pieces on which they are located and being connected in series with one another so that the voltage induced therein due to flux changes in said pole pieces substantially neutralizes one another, series windings on said main pole pieces acting in the same direction as said exciting windings located thereon, and flux by-passes inductably connecting said series and exciting windings on said main pole pieces.

JOHN I. HULL.

CERTIFICATE OF CORRECTION.

Patent No. 2,148,296.    February 21, 1939.

JOHN I. HULL.

It is hereby certified that error appears in the printed specification of the above numbered patent requiring correction as follows: Page 1, first column, line 15-16, for "invetion" read invention; page 2, first column, line 74, for the word "pieces" read piece; and second column, line 8, for "piece pole" read pole piece; page 5, first column, line 14, claim 9, for "piece" read pieces; and that the said Letters Patent should be read with this correction therein that the same may conform to the record of the case in the Patent Office.

Signed and sealed this 4th day of April, A. D. 1939.

Henry Van Arsdale
Acting Commissioner of Patents.

(Seal)